United States Patent
Shi et al.

(10) Patent No.: US 9,336,814 B1
(45) Date of Patent: May 10, 2016

(54) INVERSE TAPERED WAVEGUIDE FOR USE IN A HEAT ASSISTED MAGNETIC RECORDING HEAD

(71) Applicant: Western Digital (Fremont), LLC, Fremont, CA (US)

(72) Inventors: Zhong Shi, Dublin, CA (US); Michael V. Morelli, San Jose, CA (US); Yunfei Li, Fremont, CA (US); Matthew R. Gibbons, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/797,268

(22) Filed: Mar. 12, 2013

(51) Int. Cl.
*G11B 11/00* (2006.01)
*G11B 5/48* (2006.01)
(Continued)

(52) U.S. Cl.
CPC *G11B 13/04* (2013.01); *G02B 6/00* (2013.01); *G02B 6/122* (2013.01); *G02B 6/125* (2013.01); *G02B 6/1228* (2013.01); *G11B 5/3116* (2013.01); *G11B 5/6088* (2013.01); *G11B 7/124* (2013.01); *G11B 7/1387* (2013.01); *G11B 11/1058* (2013.01); *G11B 11/24* (2013.01)

(58) Field of Classification Search
CPC ............... G01N 2021/7703; G01N 2021/7713; G01N 2021/7716; G01N 21/7743; G01N 21/7746; G01N 2021/4166; G01N 2021/458; G11B 13/08; G11B 7/1387; G11B 7/24059; G11B 9/12; G11B 9/14; G11B 2005/0024; G11B 5/3116; G11B 5/40; G11B 7/124; G11B 7/1384; G11B 7/1395; G02B 6/1226; G02B 6/00; G02B 6/12002; G02B 6/125; G02B 2006/12147; G02B 2006/1215; G02B 6/1228

USPC .......... 385/14, 32, 129, 147.39, 1–10, 41–45; 369/13.24, 13.33, 13.32, 13.34, 13.23, 369/13.14, 13.03, 13.02, 13.12, 13.13, 369/13.01, 13.35, 112.27; 360/59, 125.31, 360/125.74, 125.67, 125.37, 125.27
See application file for complete search history.

(56) References Cited

U.S. PATENT DOCUMENTS

| 4,743,083 A | 5/1988 | Schimpe |
| 5,173,909 A | 12/1992 | Sakano et al. |

(Continued)

FOREIGN PATENT DOCUMENTS

| EP | 1498878 A2 | 1/2005 |
| EP | 1501076 A1 | 1/2005 |

OTHER PUBLICATIONS

Almeida, et al., "Nanotaper for compact mode conversion", Optics Letters, vol. 28, No. 15, pp. 1302-1304, Aug. 1, 2003.

(Continued)

*Primary Examiner* — Dionne H Pendleton

(57) ABSTRACT

A heat-assisted magnetic recording (HAMR) transducer is coupled with a laser for providing energy and has an air-bearing surface (ABS) configured to reside in proximity to a media during use. The HAMR transducer includes a write pole, at least one coil, and an inverse tapered waveguide optically coupled with the laser. The write pole is configured to write to a region of the media. The coil(s) energize the write pole. The inverse tapered waveguide includes an entrance distal from the ABS, a bottom proximate to the ABS, a first side and a second side opposite to the first side. The first side and the second side diverging such that at least a portion of the inverse tapered waveguide between the bottom and the top is wider than the entrance.

20 Claims, 6 Drawing Sheets

(51) Int. Cl.
  *G11B 5/00* (2006.01)
  *G11B 13/04* (2006.01)
  *G11B 5/60* (2006.01)
  *G11B 7/1387* (2012.01)
  *G11B 11/105* (2006.01)
  *G11B 11/24* (2006.01)
  *G11B 5/31* (2006.01)
  *G11B 7/124* (2012.01)
  *G02B 6/00* (2006.01)
  *G02B 6/125* (2006.01)
  *G02B 6/122* (2006.01)

(56) References Cited

U.S. PATENT DOCUMENTS

| | | | |
|---|---|---|---|
| 5,199,090 A | 3/1993 | Bell |
| 5,341,391 A | 8/1994 | Ishimura |
| 5,625,729 A | 4/1997 | Brown |
| 5,960,014 A | 9/1999 | Li et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,063 B1 | 2/2001 | Cameron |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,275,453 B1 | 8/2001 | Ueyanagi et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |

(56) References Cited

U.S. PATENT DOCUMENTS

| | | |
|---|---|---|
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,671,127 B2 | 12/2003 | Hsu et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,195 B2 | 2/2004 | Miyanishi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,834,027 B1 | 12/2004 | Sakaguchi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,930,975 B2 | 8/2005 | Tawa et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,810 B2 | 11/2005 | Kasiraj et al. |
| 6,969,989 B1 | 11/2005 | Mei |
| 6,975,486 B2 | 12/2005 | Chen et al. |
| 6,975,580 B2 | 12/2005 | Rettner et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,027,700 B2 | 4/2006 | Challener |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,082,007 B2 | 7/2006 | Liu et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,241 B2 | 11/2006 | Che et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |

(56) References Cited

U.S. PATENT DOCUMENTS

| | | |
|---|---|---|
| 7,170,725 B1 | 1/2007 | Zhou et al. |
| 7,171,080 B2 | 1/2007 | Rausch |
| 7,177,117 B1 | 2/2007 | Jiang et al. |
| 7,190,539 B1 | 3/2007 | Nibarger |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,268 B2 | 9/2007 | Challener et al. |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,330,404 B2 | 2/2008 | Peng et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,656 B2 | 5/2008 | Satoh et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,394,607 B2 | 7/2008 | Ohno et al. |
| 7,408,731 B2 | 8/2008 | Uemura et al. |
| 7,417,813 B2 | 8/2008 | Lim et al. |
| 7,417,821 B2 | 8/2008 | Tsuchinaga |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,221 B2 | 10/2008 | Tsuchinaga et al. |
| 7,440,660 B1 | 10/2008 | Jin et al. |
| 7,443,625 B2 | 10/2008 | Hamaguchi et al. |
| 7,443,632 B1 | 10/2008 | Stoev et al. |
| 7,444,740 B1 | 11/2008 | Chung et al. |
| 7,486,460 B2 | 2/2009 | Tsuchinaga et al. |
| 7,486,709 B2 | 2/2009 | Hu et al. |
| 7,490,212 B2 | 2/2009 | Kasiraj et al. |
| 7,492,804 B2 | 2/2009 | Tawa |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,567,387 B2 | 7/2009 | Itagi et al. |
| 7,580,602 B2 | 8/2009 | Itagi et al. |
| 7,583,466 B2 | 9/2009 | Kermiche et al. |
| 7,595,967 B1 | 9/2009 | Moon et al. |
| 7,596,072 B2 | 9/2009 | Buechel et al. |
| 7,596,295 B2 | 9/2009 | Hasegawa |
| 7,639,457 B1 | 12/2009 | Chen et al. |
| 7,649,677 B2 | 1/2010 | Jin et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,791,839 B2 | 9/2010 | Olson et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,839,497 B1 | 11/2010 | Rausch et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,169,881 B2 | 5/2012 | Balamane et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |

(56) References Cited

U.S. PATENT DOCUMENTS

| | | |
|---|---|---|
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,228,779 B2 | 7/2012 | Peng et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,264,919 B2 | 9/2012 | Komura et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,416,646 B2 | 4/2013 | Huang et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,555 B2 | 5/2013 | Seigler et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,630,517 B2 * | 1/2014 | Okayama .................. 385/37 |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |

(56) References Cited

U.S. PATENT DOCUMENTS

| | | |
|---|---|---|
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 9,047,912 B1* | 6/2015 | Peng et al. |
| 9,111,558 B1* | 8/2015 | Krichevsky ............... G02B 6/34 |
| 2001/0006435 A1 | 7/2001 | Ichihara et al. |
| 2001/0017820 A1 | 8/2001 | Akiyama et al. |
| 2003/0039443 A1 | 2/2003 | Catchmark et al. |
| 2003/0184903 A1 | 10/2003 | Challener |
| 2003/0198146 A1 | 10/2003 | Rottmayer et al. |
| 2004/0001394 A1 | 1/2004 | Challener et al. |
| 2004/0001420 A1 | 1/2004 | Challener |
| 2004/0008943 A1* | 1/2004 | Berini .............................. 385/39 |
| 2004/0027728 A1 | 2/2004 | Coffey et al. |
| 2004/0223249 A1 | 11/2004 | Kang et al. |
| 2004/0228022 A1 | 11/2004 | Ueyanagi |
| 2005/0047013 A1 | 3/2005 | Le et al. |
| 2005/0069298 A1 | 3/2005 | Kasiraj et al. |
| 2005/0071537 A1 | 3/2005 | New et al. |
| 2005/0078565 A1 | 4/2005 | Peng et al. |
| 2005/0122850 A1 | 6/2005 | Challener et al. |
| 2005/0157393 A1 | 7/2005 | Hasegawa et al. |
| 2005/0157595 A1 | 7/2005 | Tawa et al. |
| 2005/0289576 A1 | 12/2005 | Challener |
| 2006/0232874 A1 | 10/2006 | Tsuchinaga et al. |
| 2007/0030588 A1 | 2/2007 | Tsuchinaga et al. |
| 2007/0081426 A1 | 4/2007 | Lee et al. |
| 2007/0081427 A1 | 4/2007 | Suh et al. |
| 2007/0223132 A1 | 9/2007 | Tsuchinaga |
| 2008/0002529 A1 | 1/2008 | Sekine et al. |
| 2008/0049563 A1 | 2/2008 | Konno et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0204916 A1 | 8/2008 | Matsumoto et al. |
| 2008/0232225 A1 | 9/2008 | Cho et al. |
| 2010/0020431 A1 | 1/2010 | Shimazawa et al. |
| 2010/0290157 A1 | 11/2010 | Zhang et al. |
| 2011/0086240 A1 | 4/2011 | Xiang et al. |
| 2011/0205866 A1 | 8/2011 | Osawa et al. |
| 2011/0228651 A1 | 9/2011 | Gage et al. |
| 2011/0228652 A1 | 9/2011 | Gage et al. |
| 2011/0235480 A1 | 9/2011 | Goulakov et al. |
| 2012/0020195 A1 | 1/2012 | Seigler |
| 2012/0039155 A1 | 2/2012 | Peng et al. |
| 2012/0082016 A1 | 4/2012 | Komura et al. |
| 2012/0111826 A1 | 5/2012 | Chen et al. |
| 2012/0113770 A1* | 5/2012 | Stipe .......................... 369/13.33 |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0327752 A1* | 12/2012 | Snyder ....................... 369/13.13 |
| 2013/0133182 A1* | 5/2013 | Bonhote et al. ............ 29/603.03 |
| 2013/0216702 A1 | 8/2013 | Kaiser et al. |
| 2013/0216863 A1 | 8/2013 | Li et al. |
| 2013/0223196 A1* | 8/2013 | Gao et al. ................... 369/13.24 |
| 2013/0257421 A1 | 10/2013 | Shang et al. |
| 2014/0133283 A1 | 5/2014 | Maletzky et al. |
| 2014/0154529 A1 | 6/2014 | Yang et al. |
| 2014/0175050 A1 | 6/2014 | Zhang et al. |

OTHER PUBLICATIONS

McNab, et al., "Ultra-low loss photonic integrated circuit with membrane-type photonic crystal waveguides", Optics Express, vol. 11, No. 22, pp. 2927-2939, Nov. 3, 2003.

Galan, et al., "Horizontal slot waveguide-based efficient fiber couplers suitable for silicon photonics", Eindhoven, The Netherlands, pp. 237-240, Jun. 2008.

Sun, et al., "Efficient fiber coupler for vertical silicon slot waveguides", Optics Express, vol. 17, No. 25, pp. 22571-22577, Dec. 7, 2009.

Sridaran, et al., "Nanophotonic devices on thin buried oxide Silicon-On-Insulator substrates", 7 pages, Nov. 2009.

Khilo, et al., "Efficient planar fiber-to-chip coupler based on two-stage adiabatic evolution", Optics Express, vol. 18, No. 15, pp. 15790-15806, Jul. 19, 2010.

Humer, et al., "Development of Broadband, Polarization Insensitive Light Couplers for a SOI Based Integrated Optics", Proceedings GMe Forum, pp. 51-52, Apr. 2011.

Chubing Peng, "Surface-plasmon resonance of a planar lollipop near-field transducer", Applied Physics Letters 94, 171106 (2009), 3 pages.

Y.P. Rakovich, et al., "Photonic Nanojets in Coupled Microcavities", European Conference on Lasers and Electro-Optics 2009 and the European Quantum Electronics Conference (CLEO Europe—EQEC 2009), Munich, Jun. 14-19, 2009 IEEE, pp. 5191625.

\* cited by examiner

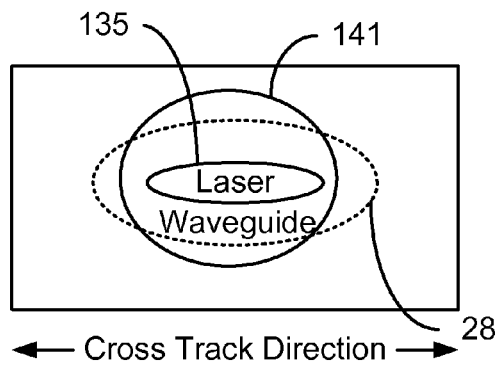
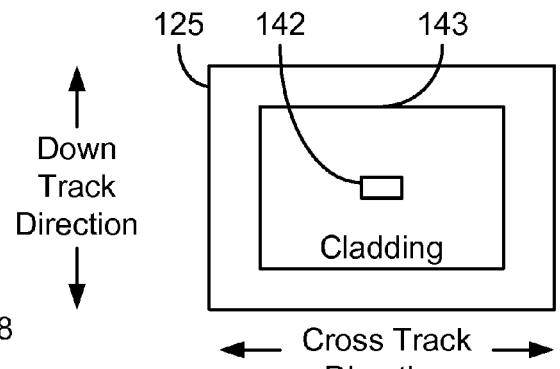
FIG. 5A
FIG. 5B
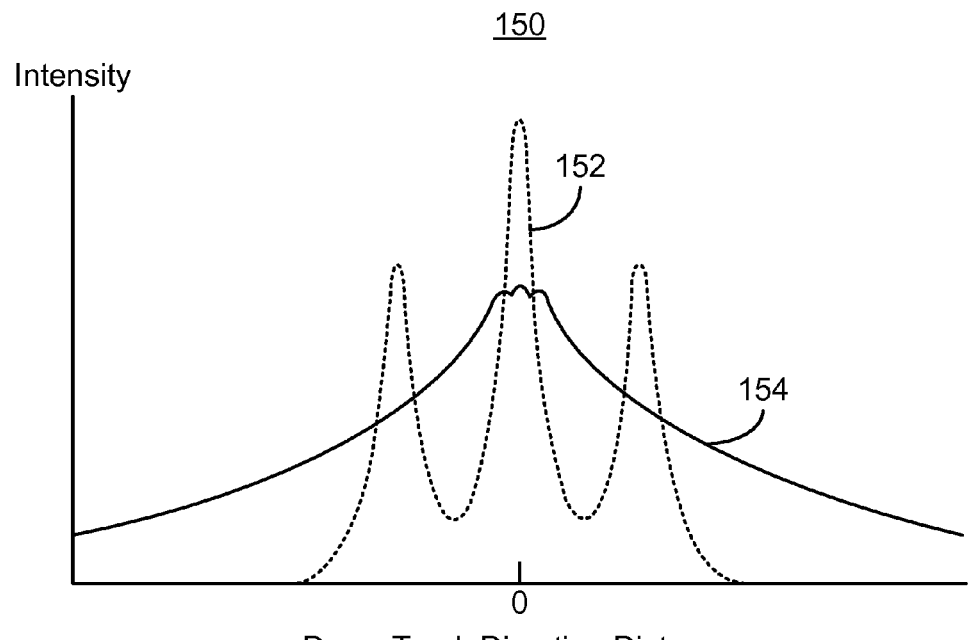
FIG. 6

INVERSE TAPERED WAVEGUIDE FOR USE IN A HEAT ASSISTED MAGNETIC RECORDING HEAD

BACKGROUND

FIG. 1 depicts a plan view of a portion of a conventional heat assisted magnetic recording (HAMR) transducer 10. The conventional HAMR transducer 10 includes a pole (not shown), coil(s) (not shown), and other components used in writing to a media (not shown). The conventional HAMR transducer 10 is coupled to a laser (not shown) for providing light energy to the HAMR transducer 10. In addition, the HAMR transducer includes a conventional waveguide 20 for directing light from the laser to a near field transducer (NFT) near the ABS.

The conventional waveguide 20 includes an entrance 22, a tapered region 24, and an exit 26 near the ABS. The tapered region 24 goes from a wider entrance 22 to a smaller cross-section. Thus, the exit 26 near the ABS is smaller in cross-section than the entrance 22. Note that the waveguide 20 in FIG. 1 is shown as tapering in the cross-track direction (left-right in FIG. 1). In some cases, the waveguide 20 may taper in the down track direction (out of the plane of the page in FIG. 1). The tapered region 24 confines the energy in the laser mode provided by the laser (not shown in FIG. 1) to a smaller waveguide mode.

FIG. 2 depicts the laser mode 30 and the conventional waveguide mode 28 for the conventional transducer 10. The entrance 22 for the waveguide 20 is also depicted in FIG. 2. Referring to FIGS. 1 and 2, the laser mode 30 corresponds to the laser spot at the entrance 22 of the waveguide 20. The waveguide mode 28 indicates the region for which energy is coupled into the waveguide 20. The entrance 22 is smaller than the mode 28 coupled into the waveguide 20. In the HAMR transducer 10 depicted in FIGS. 1-2, the laser energy/mode 30 is within the waveguide mode 28. Stated differently, the laser mode 30 is within the region 28 for which energy is coupled into the waveguide 12. Thus, the waveguide 20 provides energy to the ABS that may be used by the HAMR transducer 10 in writing to the media (not shown).

Although the conventional waveguide 20 functions, the location of the laser mode 30 may shift during fabrication of the HAMR transducer 10. For example, the laser may be aligned with the waveguide entrance 22 and then bonded. However, during the bonding process, the location of the laser may change. Thus, misalignments may occur between the laser mode 30 and the waveguide mode 28. As a result, the waveguide 20 may couple in less energy from the laser. Thus, performance of the conventional waveguide 20 may be adversely affected. In some cases, the misalignment is severe enough that the waveguide 20 does not couple in enough energy to meet the minimum standards of operation for the HAMR transducer 10. As a result, yield for fabrication of the conventional HAMR transducer 10 may be adversely affected.

Accordingly, what is needed is an improved method for fabricating a HAMR transducer.

SUMMARY

A heat-assisted magnetic recording (HAMR) transducer is coupled with a laser for providing energy and has an air-bearing surface (ABS) configured to reside in proximity to a media during use. The HAMR transducer includes a write pole, at least one coil, and an inverse tapered waveguide optically coupled with the laser. The write pole is configured to write to a region of the media. The coil(s) energize the write pole. The inverse tapered waveguide includes an entrance distal from the ABS, a bottom proximate to the ABS, a first side and a second side opposite to the first side. The first side and the second side diverging such that at least a portion of the inverse tapered waveguide between the bottom and the top is wider than the entrance.

BRIEF DESCRIPTION OF SEVERAL VIEWS OF THE DRAWINGS

FIGS. 5A and 5B depict the laser mode, an exemplary embodiment of the inverse tapered waveguide mode and the entrance of the tapered waveguide.

FIG. 6 depicts an exemplary embodiment of intensity versus distance perpendicular to the direction of travel in the waveguide.

DETAILED DESCRIPTION OF THE PREFERRED EMBODIMENTS

Figure 1:
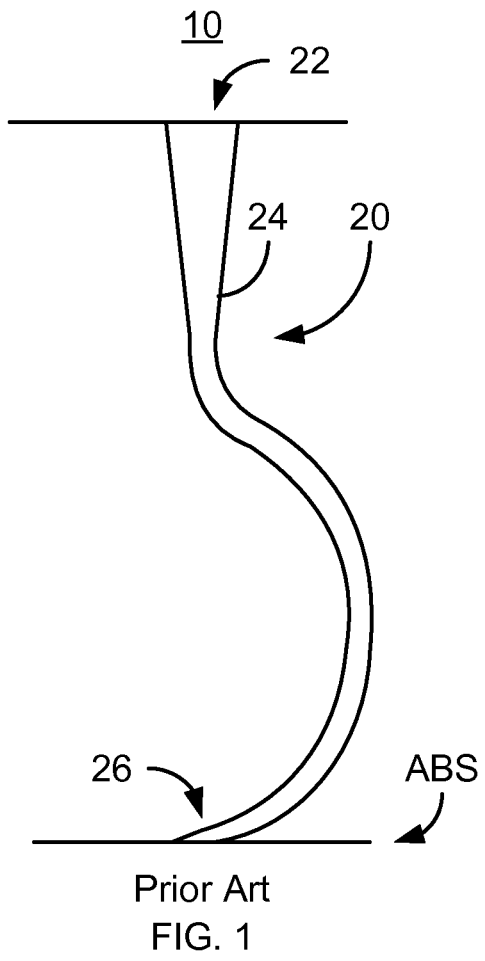
FIG. 1 is a diagram depicting a plan view of a conventional waveguide in a conventional magnetic transducer.
Figure 2:
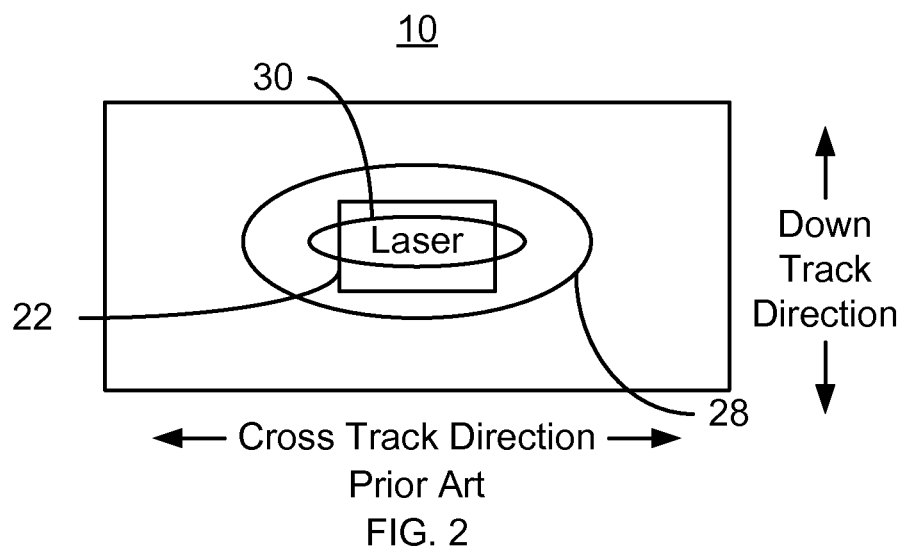
FIG. 2 depicts the laser mode and the conventional waveguide mode.
Figure 3:
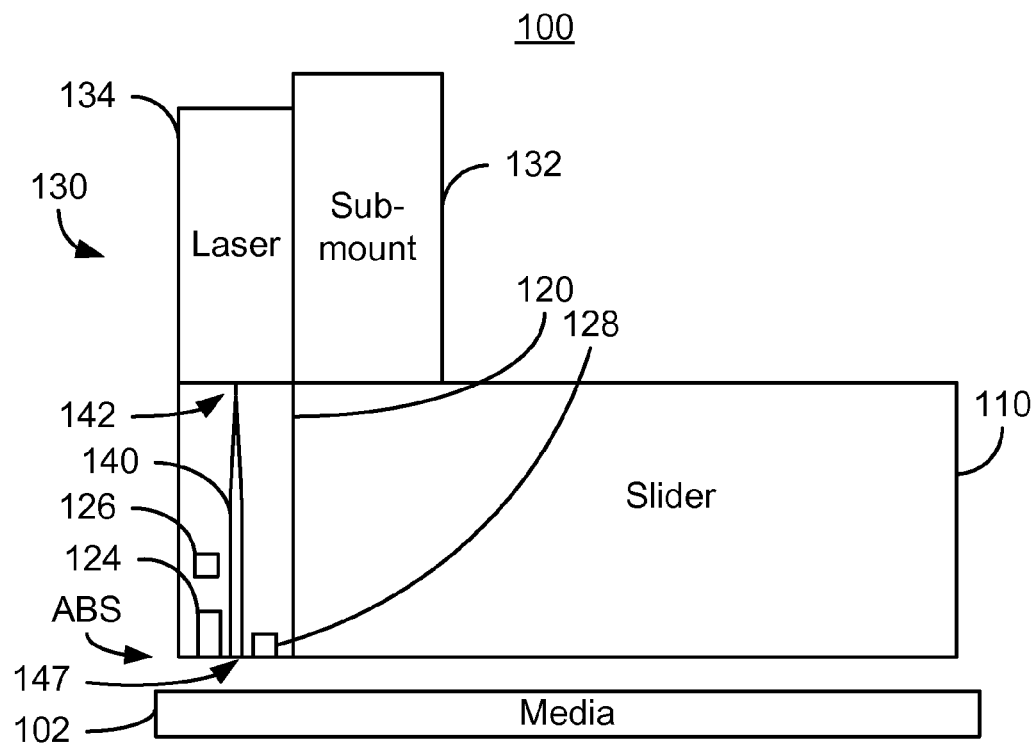
FIG. 3 is depicts an exemplary embodiment of a heat assisted magnetic recording disk drive.

FIG. 3 depicts a side view of an exemplary embodiment of a portion of a heat assisted magnetic recording (HAMR) disk drive 100. For clarity, FIG. 3 is not to scale. For simplicity not all portions of the HAMR disk drive 100 are shown. In addition, although the HAMR disk drive 100 is depicted in the context of particular components other and/or different components may be used. For simplicity, only single components 102, 110, 120, 130 and 140 are shown. However, multiples of each components 102, 110, 120, 130 and/or 140 and their sub-components, might be used.

The HAMR disk drive 100 includes media 102, a slider 110, an HAMR transducer 120 and a laser assembly 130. Additional and/or different components may be included in the HAMR disk drive 100. The slider 110, and thus the laser assembly 130 and HAMR transducer 120 are generally attached to a suspension (not shown). The HAMR transducer 120 is fabricated on the slider 110 and includes an air-bearing surface (ABS) proximate to the media 102 during use.

In general, the HAMR transducer 120 includes a write transducer and a read transducer. However, for clarity, only the write portion of the HAMR transducer 120 is shown. The HAMR transducer 120 includes a waveguide 140, write pole 124, coil(s) 126 and near-field transducer (NFT) 128. In other embodiments, different and/or additional components may be used in the HAMR transducer 120. The waveguide 140 guides light to the NFT 128, which resides near the ABS. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit.

The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode. Thus, the laser 134 typically includes at least a resonance cavity, a gain reflector on one end of the cavity, a partial reflector on the other end of the cavity and a gain medium. For simplicity, these components of the laser 134 are not shown in FIG. 3.

Figure 4:
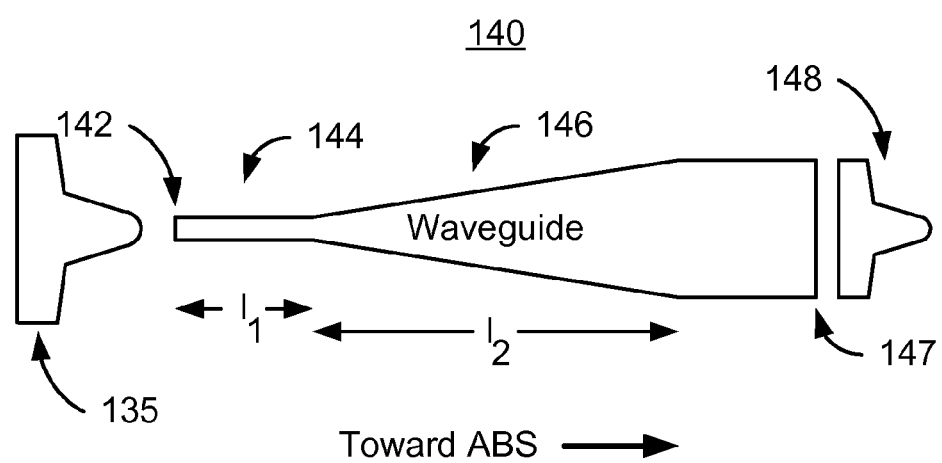
FIG. 4 depicts an exemplary embodiment of a portion of an inverse tapered waveguide.

The waveguide 140 is an inverse tapered waveguide. FIG. 4 depicts an exemplary embodiment of a portion of the waveguide 140. For clarity, FIG. 4 is not to scale. For simplicity not all portions of the inverse tapered waveguide 140 are shown. In addition, although the inverse tapered waveguide 140 is depicted in the context of particular components other and/or different components may be used. In addition to the inverse tapered waveguide 140, the laser mode 135 and waveguide mode output 148 are depicted.

Referring to FIGS. 3 and 4, the inverse tapered waveguide 140 is optically coupled with the laser 134. The inverse tapered waveguide 140 includes an entrance 142 and a bottom 147. The entrance 142 is optically coupled with the laser 142 and distal from the ABS. The bottom 147 of the inverse tapered waveguide 140 is at the ABS. In the embodiment shown, the inverse tapered waveguide 130, has a straight section 144 and a taper 146 between the entrance 142 and the bottom, or exit 147. Although not shown in FIG. 4, the inverse tapered waveguide 140 may include curved sections. Further, the inverse tapered waveguide 140 may also be an interferometric (inverse) tapered waveguide having multiple arms. The straight section 144 near the entrance 142 has a constant width and a length, $I_1$. In some embodiments, this length is not more than fifteen micrometers. In still other embodiments, the straight section has a length of not more than ten micrometers. In some embodiments, the straight section 144 may be omitted. In such embodiments, the taper 146 starts at the entrance 142.

The taper 146 is an inverse taper. Stated differently, the sides of the waveguide 140 diverge in the direction of travel of light through the waveguide: from the entrance 142 toward the bottom 147 of the waveguide. Thus, as can be seen in FIGS. 3 and 4, the bottom 147 is wider than the entrance 142. In some embodiments, the entrance 142 of the inverse tapered waveguide has a width of at least seventy nanometers and not more than one hundred sixty nanometers. In some such embodiments, the width of the entrance 142 is at least one hundred nanometers and not more than one hundred forty nanometers. The wider portion of the waveguide 140, after the taper 146 may be determined using the NFT size. In some embodiments, this width may be over five hundred nanometers. For example, the width may be up on the order of five hundred fifty nanometers. However, in other embodiments, the width is greater than one hundred forty nanometers, but less than five hundred nanometers. The taper 146 is, therefore, an inverse taper.

The sides of the waveguide 140 are shown as forming an inverse taper in the cross-track direction. The sides of the inverse tapered waveguide 130 may diverge only in the cross-track direction, only in the down track direction, or in both the cross-track and down track directions. Further, the sides of the waveguide 140 are shown as being symmetric in FIGS. 3 and 4. Thus, opposite sides of the waveguide 140 diverge in a like manner. However, in other embodiments, opposing sides of the waveguide 140 may be asymmetric and diverge in different manners.

The laser mode 135 shown in FIG. 4 corresponds to the intensity of the energy provided from the laser 132 to the entrance 142 of the waveguide 140. Some portion of this energy is coupled into the waveguide 140 and confined to the waveguide mode 148 output by the waveguide 140.

FIGS. 5A and 5B further indicate the coupling of laser energy into the waveguide 140. FIG. 5A depicts the laser mode and an exemplary embodiment of the inverse tapered waveguide mode at the entrance 142 of the waveguide 140. FIG. 5B depicts the physical extent of layers of the waveguide 140. Referring to FIGS. 3, 4, 5A and 5B, the laser mode 135 is within the waveguide mode 141. The waveguide mode 141 corresponds to the region over which energy will be coupled into the waveguide 140. For comparison, the conventional waveguide mode 28 is shown in FIG. 5A for comparison. The eccentricity of the ellipse 28 is much higher than for the waveguide mode 141. The waveguide modes 28 and 141 indicate that the waveguide 140 is significantly less susceptible to laser misalignments, particularly in the down track direction. Note in FIG. 5B the entrance 142 for the core of the waveguide 140 is shown. Also depicted are cladding 143 and surrounding insulator 125, which may include aluminum oxide. The core of waveguide 140 is typically formed of tantalum oxide. The cladding 143 may be silicon dioxide or another material. As discussed above, the width of the entrance may be one hundred sixty nanometers or less. The cladding 143 may be desired to be at least 1.4 µm and not more than 4 µm thick. In some such embodiments, the cladding 143 is desired to be at least 2.5 µm thick. In some embodiments, the cladding 143 is desired to be to 2.6-3.4 µm thick.

Using the inverse taper waveguide 140, the HAMR disk drive 100 may be improved. More specifically, the tolerance of the HAMR disk drive 100 to laser misalignments may be enhanced. As indicated in FIG. 4, although the entrance 142 of the waveguide 140 is small, the laser mode 135 may still be coupled into the waveguide. Because of the size of the entrance, the waveguide mode 141 for light coupled into the waveguide is broader in the down track direction. In other words, the waveguide mode 141 is more symmetric in the cross track and down track directions. As a result, the optical coupling between the laser 132 and the waveguide 140 is less sensitive to misalignments, particularly in the down track direction. This can be seen by the comparison of the laser mode 135 with the waveguide mode 141 and the conventional waveguide mode 28 of the conventional waveguide 20. Although the total energy coupled into the waveguide 140 for perfect alignment between the laser 132 and the waveguide 140 is reduced, in some embodiments, more HAMR disk drives 100 meet the minimum requirements for laser power coupled into the waveguide 140. Thus, tolerance to laser misalignments may be enhanced. In addition, the yield for the method of fabricating the HAMR disk drive 100 may be improved. Moreover, because of the size of the entrance 142, the waveguide mode 148 output by the waveguide 140 is more likely to be confined near the center of the waveguide, as is shown in FIG. 4. This centering of the waveguide mode 148 may also be desirable.

The improvement in the laser misalignment tolerance and yield may also be explained using FIG. 6. FIG. 6 is a graph 150 depicting an exemplary embodiment of intensity versus down track distance for energy coupled into a waveguide. The graph 150 includes curves 152 and 154 corresponding to the conventional tapered waveguide 20 and the inverse tapered waveguide 140, respectively. Although curves 152 and 154 are shown, they are for explanatory purposes only and not intended to depict data or simulation results for a particular waveguide. Because the curve 152 corresponds to the conventional waveguide, the curve 152 is shown as a dashed line. Both curves 152 and 154 have peaks at perfect alignment, corresponding to a down track distance of zero. However, the curve 154 is significantly broader and does not contain as deep minima near the global maximum as does the curve 152. Thus, although the waveguide 140 may couple in somewhat less energy from the laser 132 at perfect alignment, the waveguide 140 may couple in a greater intensity when the laser 132 is misaligned (at nonzero down track distance). Thus, the waveguide 140 may have improved tolerance to misalignments. The HAMR disk drive 100 may thus have improved fabrication yield.

Figure 7:
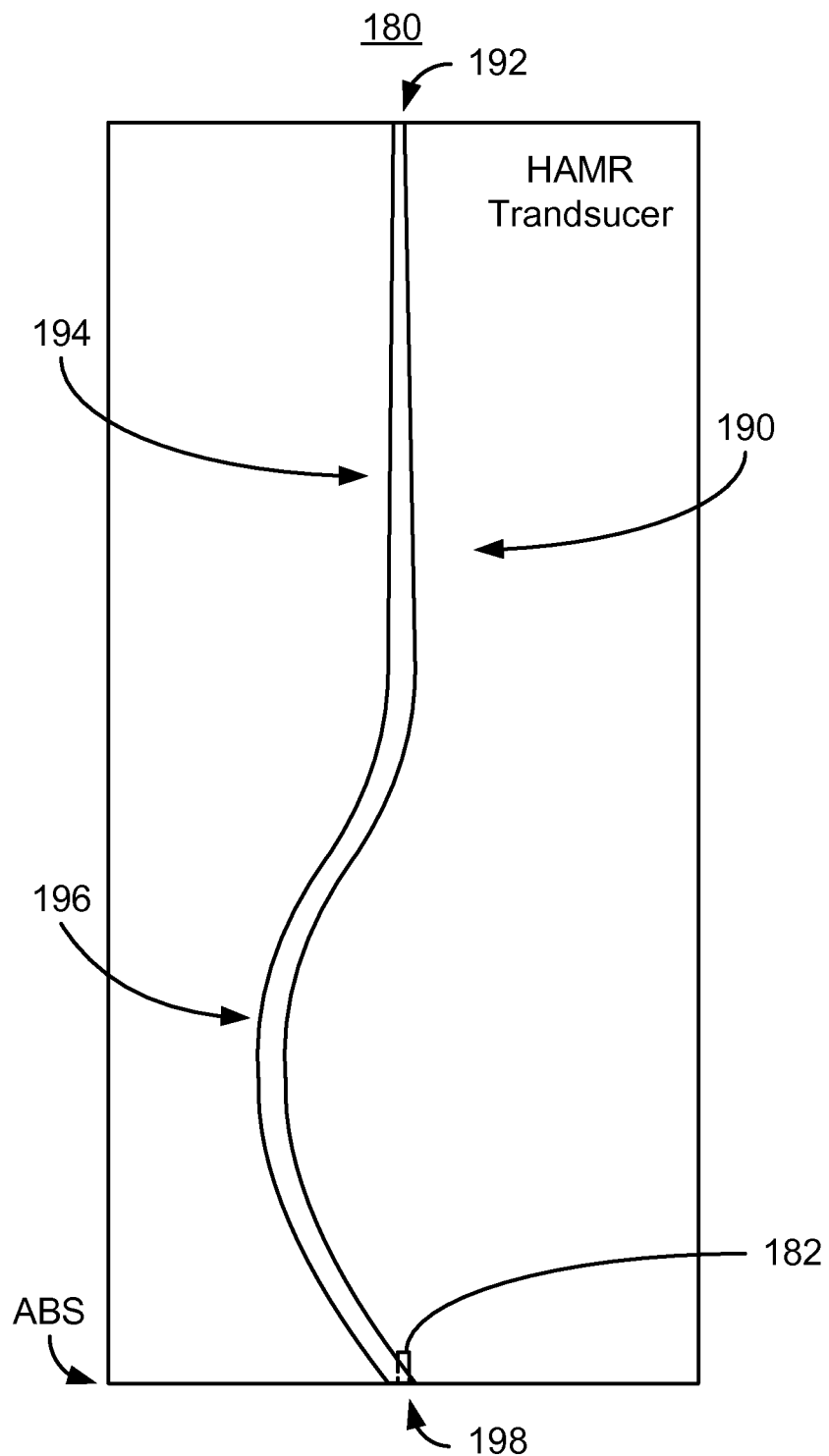
FIG. 7 depicts another exemplary embodiment of an inverse tapered waveguide.

FIG. 7 depicts another exemplary embodiment of an inverse tapered waveguide 190 in a HAMR transducer 180. For clarity, FIG. 7 is not to scale. The HAMR transducer 180 and waveguide 190 correspond to the HAMR transducer 120 and waveguide 140, respectively. The HAMR transducer 180 and waveguide 190 thus may be used in the HAMR disk drive 100. For simplicity, not all portions of the waveguide 190 or HAMR transducer 180 are shown. The waveguide 190 includes an entrance 192 and a bottom 198 that is near the NFT 182 for the HAMR transducer 180. The waveguide 190 also includes an inverse taper 194 and a curved region 196. As can be seen in FIG. 7, the taper 194 is an inverse taper. Thus, the width in the cross track direction (left to right in FIG. 7) for the entrance 192 is less than that of the bottom 198. In some embodiments, the taper 194 only increases the width of the waveguide 190 in the cross track direction. In other embodiments, the taper 194 increases the width of the waveguide 190 in the down track direction (out of the plane of the page in FIG. 7). In still other embodiments, the taper 192 may increase the width of the waveguide 190 in both the down track and cross track directions. Further, the taper 194 is depicted as symmetric. In other embodiments, the taper 194 may not be symmetric.

In some embodiments, the dimensions of the waveguide 190 may be analogous to those discussed above. For example, the entrance 192 may have a width of at least seventy nanometers and not more than one hundred sixty nanometers. In some such embodiments the width of the entrance 192 is at least one hundred nanometers and not more than one hundred forty nanometers. The width of the bottom 198 of the waveguide 190 may be determined based on the NFT 182. In some embodiments, the width of the bottom 198 is not more than five hundred nanometers, but greater than the width of the entrance 192. In other embodiments, the width of the bottom 198 may be greater than five hundred nanometers.

The waveguide 190 may share the benefits of the waveguide 140. In particular, use of the inverse taper 194 improves the tolerance of the waveguide 190 to laser misalignments. Thus, the yield for fabricating the waveguide 190 and, therefore, the HAMR transducer 180, may be improved. Further, the ability of the waveguide 190 to rapidly confine the waveguide mode to the center of the waveguide 190 may be enhanced.

Figure 8:
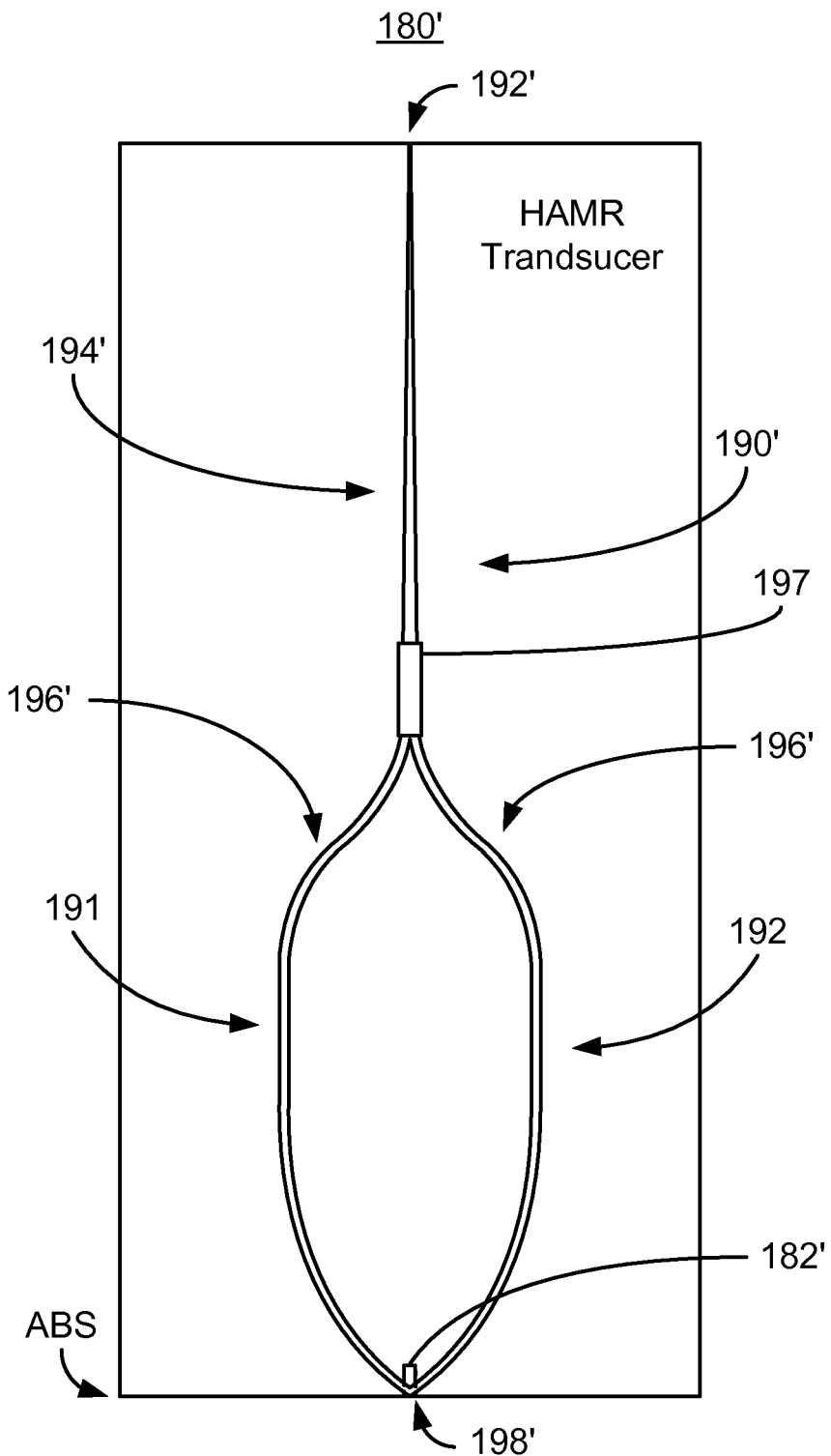
FIG. 8 depicts another exemplary embodiment of an inverse tapered waveguide.
Figure 9:
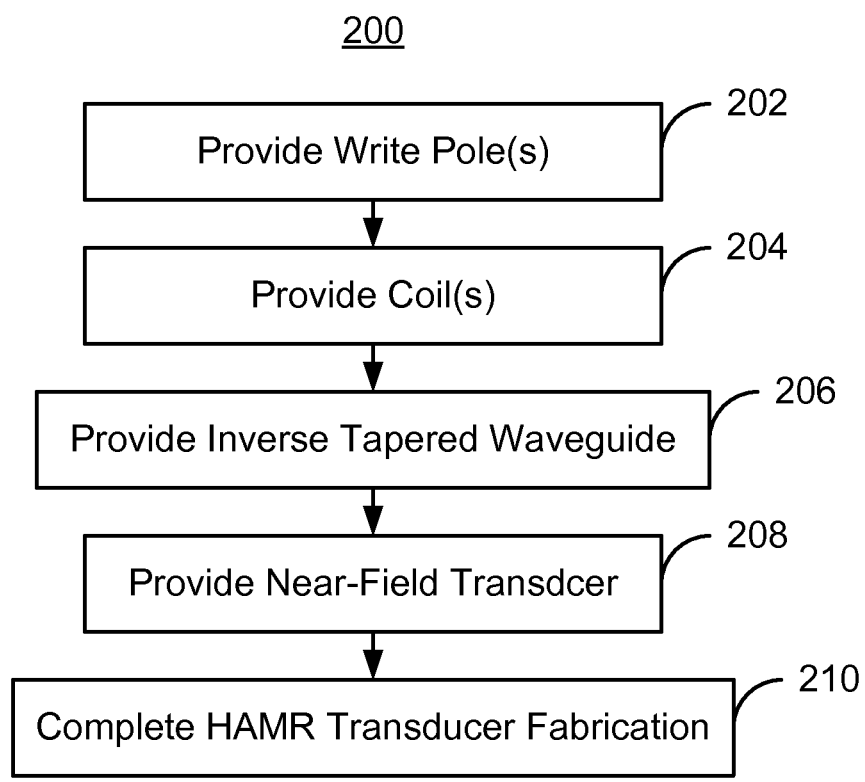
FIG. 9 is a flow chart depicting an exemplary embodiment of a method for fabricating an interferometric tapered waveguide for a magnetic recording transducer.

FIG. 8 depicts another exemplary embodiment of an inverse tapered waveguide 190' in a HAMR transducer 180'. For clarity, FIG. 8 is not to scale. The HAMR transducer 180' and waveguide 190' correspond to the HAMR transducer 120/180 and waveguide 140/190, respectively. The HAMR transducer 180' and waveguide 190' thus may be used in the HAMR disk drive 100. For simplicity, not all portions of the waveguide 190' or HAMR transducer 180' are shown. The waveguide 190' is an interferometric tapered waveguide (ITWG). The waveguide 190' thus has multiple arms. In the embodiment shown, the waveguide 192' has two arms 191 and 193. Also shown is a multimode interferometric (MMI) device 197 that splits the arms 191 and 192. In other embodiments, another mechanism for forming the arms 191 and 192, such as a Y-splitter, may be used. The arms 191 and 192 have curved regions 196'.

The ITWG 190' also includes an entrance 192' and a bottom 198' that is near the NFT 182' for the HAMR transducer 180'. The waveguide 190' also includes an inverse taper 194'. Thus, the width in the cross track direction (left to right in FIG. 8) for the entrance 192' is less than that of the bottom 198'. In some embodiments, the taper 194' only increases the width of the waveguide 190' in the cross track direction. In other embodiments, the taper 194' increases the width of the waveguide 190' in the down track direction (out of the plane of the page in FIG. 8). In still other embodiments, the taper 192' may increase the width of the waveguide 190' in both the down track and cross track directions. Further, the taper 194' is depicted as symmetric. In other embodiments, the taper 194' may not be symmetric.

In some embodiments, the dimensions of the waveguide 190' may be analogous to those discussed above. For example, the entrance 192' may have a width of at least seventy nanometers and not more than one hundred sixty nanometers. In some such embodiments the width of the entrance 192' is at least one hundred nanometers and not more than one hundred forty nanometers. The width of the bottom 198 of the waveguide 190' may be determined based on the NFT 182. In some embodiments, the width of the bottom 198' is not more than five hundred nanometers, but greater than the width of the entrance 192'. In other embodiments, the width of the bottom 198' may be greater than five hundred nanometers.

The waveguide 190' shares the benefits of the waveguides 140 and 190. In particular, use of the inverse taper 194' improves the tolerance of the waveguide 190' to laser misalignments. Thus, the yield for fabricating the waveguide 190' and, therefore, the HAMR transducer 180', may be improved. Further, the ability of the waveguide 190' to rapidly confine the waveguide mode to the center of the waveguide 190' may be enhanced. In addition, the benefits of using an ITWG may also be attained.

FIG. 10 is a flow chart depicting an exemplary embodiment of a method 200 for fabricating waveguides in heat assisted magnetic recording (HAMR) transducers. In particular, the method 200 may be used in fabricating an inverse tapered. For simplicity, some steps may be omitted, performed in another order, interleaved with other steps and/or combined. The magnetic recording transducer being fabricated may be part of a merged head that also includes a read head (not shown) and resides on a slider (not shown) in a disk drive. The method 200 is described in the context of forming a single transducer 120 in a disk drive 100. However, the method 200 may be used to fabricate multiple transducers at substantially the same time. Further, the method 200 may be used in fabricating other transducer including but not limited to the transducers 180 and/or 180'. The method 200 and system are also described in the context of particular layers. However, in some embodiments, such layers may include multiple sublayers. The method 200 also may commence after formation of other portions of the magnetic recording transducer.

A write pole configured to write to a region of the media 102 is provided, via step 202. Step 202 typically include multiple substeps that form the pole 124. One or more write coils 126 are provided, via step 204.

An inverse tapered waveguide 140 optically coupled with the laser 132 is provided, via step 206. Step 206 typically includes depositing cladding and core layers for the waveguide 140 and defining the waveguide 140 using photolithography. Step 206 may also be used to provide the waveguide 190 and/or 190'. An NFT 128 is also provided, via step 208. Step 208 may include depositing an Au layer, providing mask(s) that cover a portion of the Au, and removing an exposed portion of the Au. Thus, the NFT 128 may be formed. Fabrication of the HAMR transducer 120 may then be completed, via step 210.

Using the method 200, the waveguide 140, 190 and/or 190' may be formed. Because of the use of the inverse taper and small entrances 142/192/192' the waveguides 140/190/190' have greater tolerance for misalignments. Further, the ability of the waveguide 140/190/190' to rapidly confine the waveguide mode to the center of the waveguide 140'190/190' may be enhanced. Consequently, performance of the HAMR transducer 120/180/180' may be enhanced and the yield for the method 200 improved.

We claim:

1. A heat assisted magnetic recording (HAMR) transducer coupled with a laser for providing energy and having an air-bearing surface (ABS) configured to reside in proximity to a media during use, the HAMR transducer comprising:
   a write pole configured to write to a region of the media;
   at least one coil for energizing the write pole; and
   an inverse tapered waveguide including an entrance distal from the ABS, a bottom proximate to the ABS, a first side and a second side opposite to the first side, the first side and the second side diverging such that the bottom of the inverse tapered waveguide is wider than the entrance, the entrance of the waveguide being directly optically coupled with the laser, the first side and the second side diverging without converging such that any portion of the inverse tapered waveguide is not narrower than any other portion of the tapered waveguide that is closer to the entrance.

2. The HAMR transducer of claim 1 wherein the first side and the second side are symmetric.

3. The HAMR transducer of claim 1 wherein an additional portion of the waveguide between the entrance and the bottom is curved.

4. The HAMR transducer of claim 1 wherein the waveguide is an interferometric inverse tapered waveguide including a plurality of arms.

5. The HAMR transducer of claim 1 wherein the first side and the second side correspond to a cross-track direction on the media.

6. The HAMR transducer of claim 1 wherein the first side and the second side correspond to a down track direction on the media.

7. The HAMR transducer of claim 1 further comprising:
   a near-field transducer (NFT) directly optically coupled with the bottom of the waveguide.

8. The HAMR transducer of claim 1 wherein the entrance of the inverse tapered waveguide has a width of at least seventy nanometers and not more than one hundred sixty nanometers.

9. The HAMR transducer of claim 8 wherein the width is at least one hundred nanometers and not more than one hundred forty nanometers.

10. The HAMR transducer of claim 1 wherein the inverse tapered waveguide includes a first portion adjoining the entrance having a substantially constant width and a second portion adjoining the first portion, the first side and the second side diverging in the second portion.

11. The HAMR transducer of claim 10 wherein the first portion has a length in an optical transmission direction of not more than fifteen micrometers.

12. A heat assisted magnetic recording (HAMR) transducer coupled with a laser for providing energy and having an air-bearing surface (ABS) configured to reside in proximity to a media during use, the HAMR transducer comprising:
   a write pole configured to write to a region of the media;
   at least one coil for energizing the write pole; and
   an inverse tapered waveguide including an entrance distal from the ABS, a bottom proximate to the ABS, a first side and a second side opposite to the first side, the entrance having a width of at least one hundred ten and not more than one hundred forty nanometers, the inverse tapered waveguide also including a first portion adjoining the entrance having a substantially constant width and a second portion adjoining the first portion, the first portion having a length of not more than fifteen micrometers, the first side and the second side diverging in the second portion to a waveguide width of not more than five hundred nanometers, the first side and the second side diverging such that the bottom of the inverse tapered waveguide is wider than the entrance, the entrance of the waveguide being directly optically coupled with the laser, the first side and the second side diverging without converging such that any portion of the inverse tapered waveguide is not narrower than any other portion of the tapered waveguide that is closer to the entrance.

13. A heat assisted magnetic recording (HAMR) disk drive comprising:
   a media for storing data;
   a slider having an air-bearing surface (ABS) configured to reside in proximity to the media during use;
   a laser coupled with the slider for providing energy; and
   an HAMR transducer coupled with the slider and including a write pole, at least one coil, and an inverse tapered waveguide, the write pole being configured to write to a region of the media, the at least one coil for energizing the write pole, the inverse tapered waveguide including an entrance distal from the ABS and a bottom proximate to the ABS, a first side and a second side opposite to the first side, the first side and the second side diverging such that the bottom of the inverse tapered waveguide is wider than the entrance, the entrance of the waveguide being directly optically coupled with the laser, the first side and the second side diverging without converging such that any portion of the inverse tapered waveguide is not narrower than any other portion of the tapered waveguide that is closer to the entrance.

14. The HAMR disk drive of claim 13 wherein the HAMR transducer further includes:
   a near-field transducer (NFT) directly optically coupled with the bottom of the waveguide.

15. A method for fabricating a heat assisted magnetic recording (HAMR) transducer coupled with a laser for providing energy and having an air-bearing surface (ABS) configured to reside in proximity to a media during use, the method comprising:
   providing a write pole configured to write to a region of the media;
   providing at least one coil for energizing the write pole; and
   providing an inverse tapered waveguide including an entrance distal from the ABS and a bottom proximate to the ABS, a first side and a second side opposite to the first side, the first side and the second side diverging such that the bottom of the inverse tapered waveguide is wider than the entrance, the entrance of the waveguide being directly optically coupled with the laser, the first side and the second side diverging without converging such that any portion of the inverse tapered waveguide is not narrower than any other portion of the tapered waveguide that is closer to the entrance.

16. The method of claim 15 wherein at least an additional portion of the waveguide between the entrance and the bottom is curved.

17. The method of claim 15 wherein the waveguide is an interferometric inverse tapered waveguide including a plurality of arms.

18. The method of claim 15 wherein the entrance of the inverse tapered waveguide has a width of at least one hundred nanometers and not more than one hundred forty nanometers.

19. The method of claim 15 wherein the inverse tapered waveguide includes a first portion adjoining the entrance having a substantially constant width and a second portion adjoining the first portion, the first side and the second side diverging in the second portion.

20. The method of claim 19 wherein the first portion has a length in an optical transmission direction of not more than fifteen micrometers.

* * * * *